May 28, 1935.   E. F. HUNT   2,002,741
SCREW FASTENING MEANS
Filed July 30, 1932
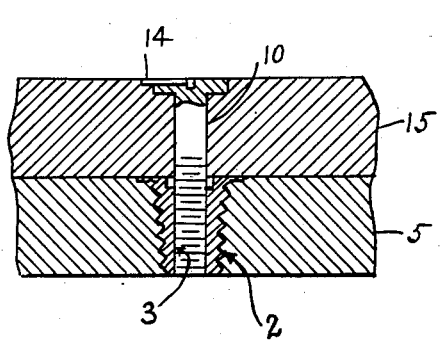
Fig.1.
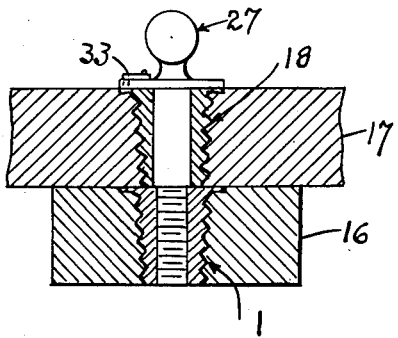
Fig.2.
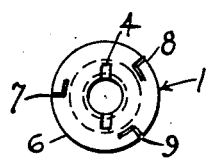
Fig.3.
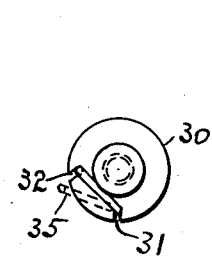
Fig.9.
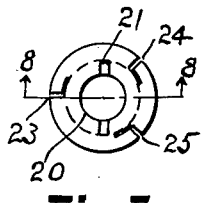
Fig.7.
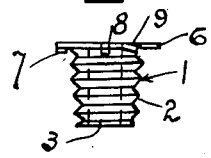
Fig.4.
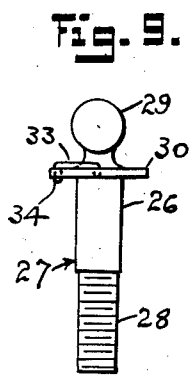
Fig.10.
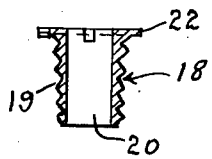
Fig.8.
Fig.5.
Fig.6.
Emma F. Hunt
INVENTOR.
BY Charles O. Clarke
ATTORNEY.

Patented May 28, 1935

2,002,741

UNITED STATES PATENT OFFICE 2,002,741

SCREW FASTENING MEANS

Emma F. Hunt, Brooklyn, N. Y.

Application July 30, 1932, Serial No. 627,059

2 Claims. (Cl. 85—1)

My invention relates to screws and refers more particularly to self locking screws.

One object of my invention is to provide a screw with outside wood threads, inside machine threads and a flanged head with locking upsets, that will serve as a nut.

Another object of my invention is to provide a screw with outside wood threads, inside through hole and a flared head with locking upsets, that will serve as a bearing.

A further object of my invention is to provide a means for holding two objects together with self locking screws.

A most important object of my invention is to provide a means for pivotally holding an object in various positions.

I attain these objects by the means illustrated in the accompanying drawing, wherein similar parts are indicated by like numerals throughout the several views, in which:—

Figure 1 is a section of the screws holding two objects rigidly together.

Figure 2 is a section of the screws pivotally holding two parts.

Figure 3 is a plan of the threaded locking female element.

Figure 4 is a side elevation of Figure 3.

Figure 5 is a plan of the locking screw or the male element utilized in Figure 1.

Figure 6 is a side elevation of Figure 5.

Figure 7 is a plan of the locking screw with a through hole.

Figure 8 is a section taken on lines 8—8 of Figure 7.

Figure 9 is a plan of the pivot screw.

Figure 10 is a side elevation of the pivot screw.

The screw device shown in Figure 1 is comprised of a self locking screw 1, having wood threads 2, on the outside and machine threads 3, in the center and the top is slotted at 4, to provide means for screwing the part to the object 5.

This screw 1, has a flange 6, that is upset at 7, 8 and 9, so that when the part is screwed into position, the upset portions prevent its removal.

The male element 10, is provided with machine threads 11, that engage with the threads 3, in part 1, and this element has a head 12, that is slotted at 13, and carries a locking pin 14, that prevents the screw from coming out of the part 15, as clearly shown in Figure 1.

The screw device shown in Figure 2, is comprised of the same element 1, which when positioned is locked in the object 16, as shown, and in the object 17, is locked the bearing element 18.

This element 18, is wood threaded on the outside 19, and has a centrally arranged hole 20 passing entirely through the screw, a screw slot 21, for screwing the same in the part 17, and a flange 22, provided with upset portions 23, 24 and 25.

Within this hole 20, the body 26, of the screw 27, rotatably fits and the threaded end 28, engages with the threads 3, of the part 1.

This screw is provided with a head 29, and a flange 30, that is slotted at 31 and 32 to carry the pin 33, pivotally fixed thereto with the end 34, projecting below the flange 30.

It is obvious that when the parts 1 and 18, are screwed home, that the upset portions will prevent their removal unless raised up by force and that when the screw 10 is home, the pin 14 can be pressed into the part 15, and thus prevent the removal of the screw.

It is self evident that the screw 27, can be used as a pivot by swinging the lock pin 33, in the position shown by the dotted lines 35, as indicated in Figure 9, or that the pin may engage in the upsets 23, 24 or 25 and thus limit the movement of the moving element.

Having thus illustrated and described the preferred embodiment of my invention, I do not wish to limit myself to the exact construction or arrangement of parts shown, since it is evident that modifications may be made therein without departing from the spirit of the invention or scope of the claims.

I claim:—

1. A male and female screw for pivotally holding an object, comprised of a female member having on outside wood screw thread, and an inside machine screw thread, a flange with a multiple of downwardly upset portions adjacent its periphery and a slot on the flange of less length than the diameter of the flange, a bearing member having on outside wood screw thread, an inside through hole, a flange with a multiple of downwardly upset portions thereon and a screw slot in the flange and a male member provided with machine screw threads engageable with the machine screw threads of the female member, a head with a handle, said head provided with a flange holding an adjustable locking pin.

2. In a fastening device, a headed female member having an outside wood screw thread, a slot in the head of less length than the diameter of the head, an inside machine screw thread and a multiple of downwardly projecting upset prongs in the head adjacent its periphery.

EMMA F. HUNT.